April 12, 1927. 1,624,683
L. SKOK
METAL CASING FOR LEAF SPRINGS
Filed Nov. 14, 1921   2 Sheets-Sheet 1
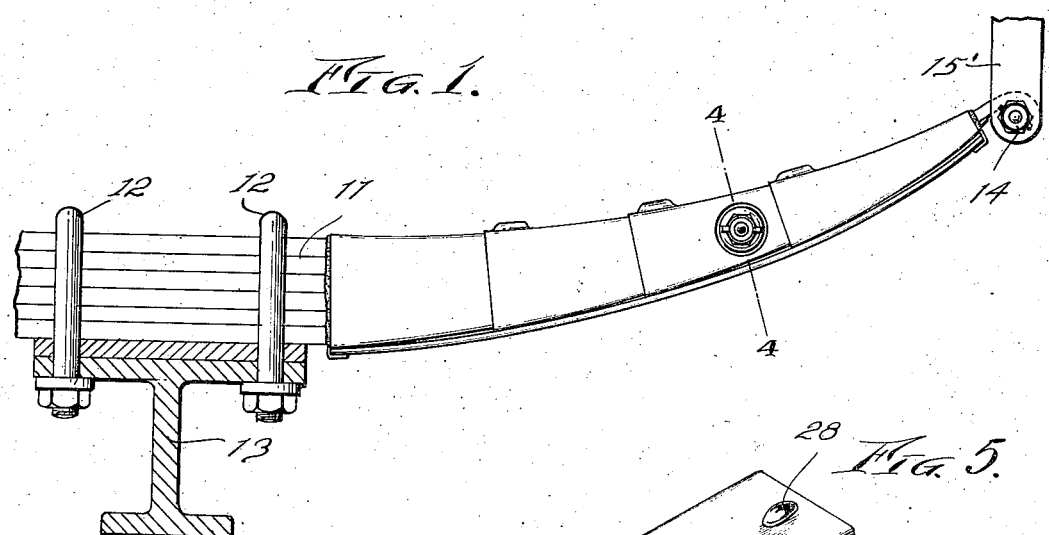
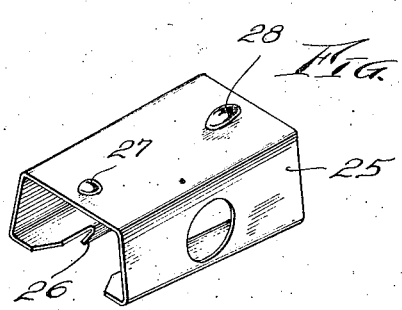
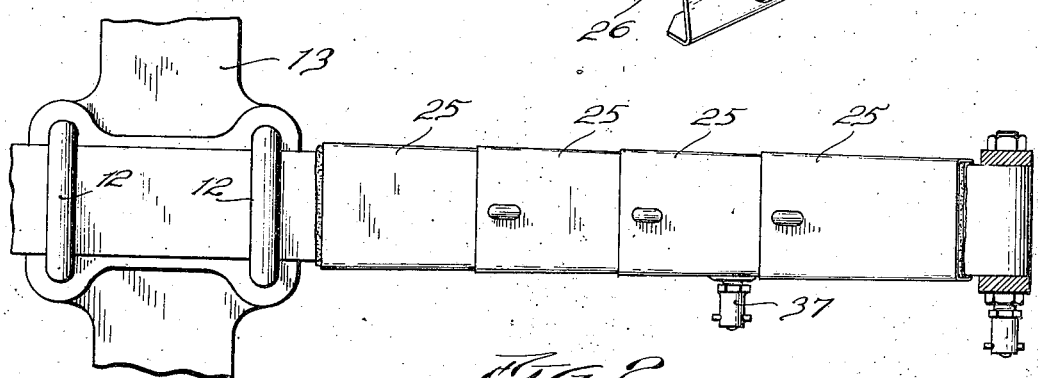
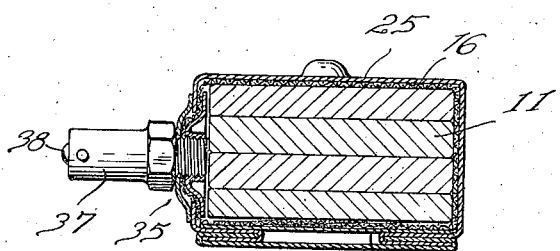
INVENTOR,
Lawrence Skok.
By Baker & Maeklin,
ATTYS April 12, 1927.
L. SKOK
1,624,683
METAL CASING FOR LEAF SPRINGS
Filed Nov. 14, 1921   2 Sheets-Sheet 2
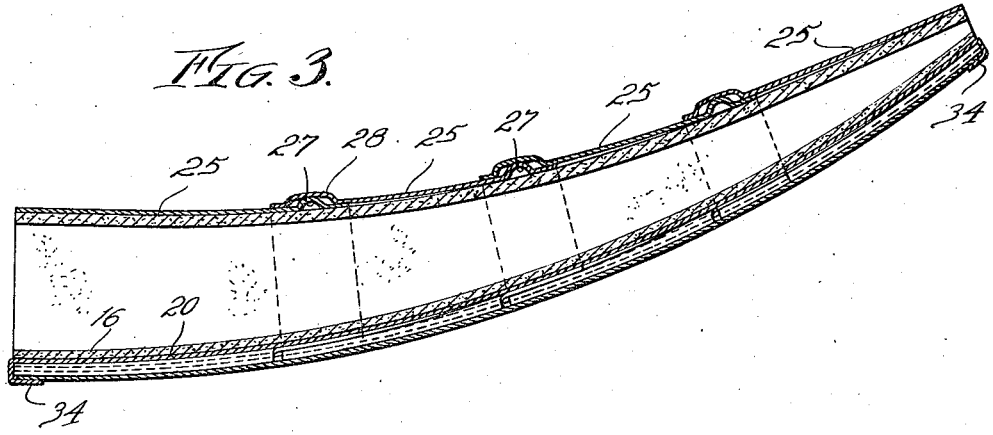
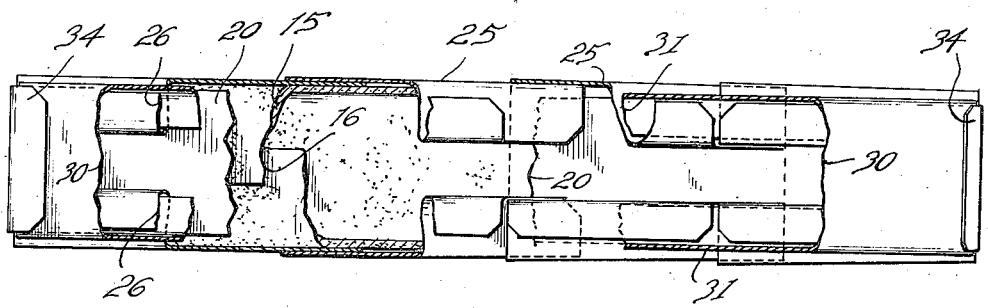
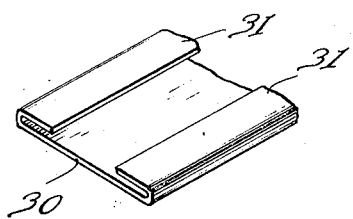
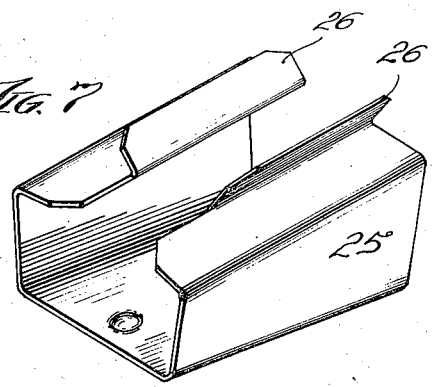
INVENTOR,
Lawrence Skok,
BY Baker & Mecklin,
ATTYS Patented Apr. 12, 1927.

1,624,683

UNITED STATES PATENT OFFICE.

LAWRENCE SKOK, OF CLEVELAND, OHIO, ASSIGNOR TO THE APEX SPRING COVER COMPANY, OF CLEVELAND, OHIO, A CORPORATION OF OHIO.

METAL CASING FOR LEAF SPRINGS.

Application filed November 14, 1921. Serial No. 514,912.

This invention relates to lubricating devices for springs for automobiles or other vehicles.

Numerous devices have been heretofore employed for lubricating springs, while still permitting a flexing action between adjacent leaves, but in most cases, these devices have been concerned with a low pressure system as embodied in a hand grease cup and with a layer of absorbent material which extends longitudinally of the springs. I have found, however, that the pressure between adjacent leaves easily forces the lubricant outwardly, so that the interior portion is not lubricated, even though the absorbent fabric is saturated with lubricating material.

Accordingly, to overcome the tendency of the spring to force the lubricant outwardly, my invention contemplates the provision of a casing which entirely surrounds the spring and provides in effect, a pressure chamber which is adapted to hold lubricant under pressure and still permit the flexing operation of the leaves. In this connection, my invention is directed toward the adaptation of a metal casing composed of articulated elements, such as is set forth in Patent No. 1,284,482 issued to me on November 12, 1918, to this method of high pressure lubrication.

Another object is the construction and arrangement of parts for enabling the device to be readily attached to existing springs, without necessitating any changes in the construction thereof.

In carrying out the above objects, I provide a layer of flexible, lubricant-proof material which entirely surrounds the springs to be covered, and I provide a metallic casing in the nature of an armor which is capable of withstanding high internal pressure and of still permitting the leaves to be readily flexed. In addition, provision is made for a valve for permitting lubricant to be injected into the springs under pressure and to be retained therein when the source of supply is removed.

The means for accomplishing the above objects will be more fully set forth in the following description which relates to the drawings, and the essential characteristics will be summarized in the claims.

In the drawings, Fig. 1 is an elevation of a spring lubricating device embodying my invention; Fig. 2 is a plan view of the device shown in Fig. 1; Fig. 3 is a longitudinal section taken vertically through the spring shown in Figs. 1 and 2; Fig. 4 is a transverse section taken on the line 4—4 in Fig. 1; Figs. 5, 6 and 7 are perspective views showing sections of the armored casing; Fig. 8 is a bottom view of the spring casing having portions thereof broken away to show the relative arrangement of the lubricator and casing.

In the various figures, I have shown a spring of a semi-elliptic type having leaves 11, which are secured by the bolts 12 to the axle 13 and by customary pivot connections 14 to the frame 15'. Surrounding the leaves between the axle and frame, I provide a dust-proof casing in the form of a pressure chamber for enabling lubricant to be retained therein against pressure, exerted by the flexing action of the springs, so that this flexing action is utilized for permitting lubricant to flow between the leaves and to be retained therein during their normal flexing operation.

To retain the lubricant adjacent the leaves, I provide a layer of liquid-proof material 15, such as heavy canvas, which entirely surrounds the springs and is overlapped as at 16 preferably on the bottom of the spring. This layer extends the entire length of the spring between the axle and frame, and is arranged to be held in close-fitting engagement therewith by means of a casing which will be now described.

Extending along the lower side of the spring, I provide a strip 20 which is substantially the width of the leaves and constructed of light sheet metal. This strip abuts the casing 15 and holds the overlapped edges thereof together and in engagement with the bottom of the spring.

The armored casing which surrounds the jacket 15 comprises a plurality of sections 25, preferably formed of light sheet metal and extending across the top and sides of the spring. Each section is provided with a pair of outwardly extending flanges 26 adjacent the bottom of the spring and with a projection, as at 27, on one end which cooperates with an elongated cavity 28 on the near end of the adjacent section for allowing the spring to flex. A rail 30 having inwardly extending flanges 31, which are complementary to the flanges 26, extends longitudinally of and along the under side of the spring and is employed for holding the sections 25 against the jacket 15. The rail and strip 20 therefore constitute a continuous metallic casing. The ends of the strip 20 terminate in tongues 34, which project beyond the end sections, and which are arranged to be turned inwardly and over the ends of the rail 30 so as to prevent it from moving relatively to the sections during the flexing operation of the springs.

After the jacket and casing are secured to the spring, the ends of the outside sections are crimped to the leaves whereby the interior constitutes in effect, a pressure chamber wherein lubricant may be forced under pressure and thereafter retained. The cooperating projections and cavities 27 and 28 still permit the sections intermediate the ends to move relatively to each other during the flexing operation without disturbing the crimped end sections. Such flexing movement is then utilized for permitting the lubricant to flow between the leaves.

To permit the lubricant to be forced under pressure within the jacket, I have shown a threaded thimble 35 which extends through the jacket 15, and through one of the sections 25 adjacent the side of the spring. This thimble is arranged to receive a member 37 which may be equipped with a spring operated ball valve 38 whereby lubricant may be forced into the chamber and be held therein.

From the foregoing description, it will be seen that I have provided a spring lubricating device which is well adapted for retaining lubricant under pressure, while still permitting a flexing operation to occur without permitting the retained lubricant to escape. An advantage of such constuction is, that since the lubricant is under pressure, the normal flexing operation results in permitting the lubricant to flow between the leaves. A further advantage lies in the fact that the flexible jacket and armored casing may be readily attached to existing springs without dismantling the motor vehicle.

Having thus described my invention, I claim:—

1. A device of the character described comprising in combination, a spring having separate leaves, a cover therefor having a pressure chamber surrounding the springs, said chamber being formed by a jacket of fluid-proof material, and a reinforcing metallic casing entirely surrounding and closely fitting the jacket, said casing comprising sections of light sheet metal having the ends of adjacent sections overlapping each other, and means for sealing the end sections, whereby lubricant under pressure may be retained within said jacket.

2. In a device of the character described, the combination with a vehicle spring comprising separate leaves, of a fabric jacket extending around four sides of the spring, a reinforcing casing closely fitting the jacket, said casing comprising sections of light sheet metal placed end to end with a lap joint between adjacent sections, means for anchoring the extreme end of the casing to the spring, whereby fluid under pressure may be retained in the jacket, and means associated with each section for permitting the flexing operation of the spring without breaking said seal.

3. In a device of the character described, the combination with a spring, of a wrapping of fluid-proof fabric extending entirely around the spring and having the ends thereof overlapping on the bottom of the spring, an impervious metallic casing surrounding and closely fitting the fabric and comprising individual sections overlapping each other, the two end sections having the ends thereof anchored to the springs, and means extending through one of the sections and communicating with the interior of the jacket for permitting fluid under pressure to be injected within said jacket, whereby a pressure may be built up within the jacket to force the lubricant into said spring.

4. In a device of the character described, the combination of a fabric jacket extending entirely around the spring, a casing enclosing and closely fitting the jacket and having the ends thereof sealed and anchored to the spring whereby a pressure chamber is formed, said casing comprising rigid members placed end to end interfitting one with the other, means associated with the individual sections for permitting a flexing operation of the spring without breaking the seal, and a lubricant feeding device projecting laterally from the sides of the spring, said device being arranged to permit lubricant under pressure to be injected within the jacket sufficiently to force the lubricant between the leaves.

5. In combination, a laminated spring, a covering therefor comprising an inner lubricant impervious lining, a flexible metallic jacket extending throughout the length of the spring and secured at its ends in clamped relation to the spring and means in clamped relation with said casing and the lining for connecting the interior of the casing to lubricant pressure and feeding means whereby lubricants may be forced throughout the length of the lining and between the respective spring leaves under high pressure.

6. In combination a laminated spring, a lubricant receiving casing comprising an inner flexible lubricant impervious lining completely surrounding the spring leaves, an outer metallic reinforcing casing closely embracing the lining, and grease gun coupling means mounted on the casing including clamping means for tightening the lining to the casing around aligned openings formed in the lining and casing.

7. In combination a laminated spring, a lubricant receiving casing comprising an inner flexible lubricant impervious lining completely surrounding the spring leaves, an outer metallic reinforcing casing closely embracing the lining, and grease gun coupling means attached to the device to engage the lining, tightly whereby the escape of lubricant at the place of attachment is prevented.

8. In combination a laminated spring, a lubricant receiving casing comprising an inner flexible lubricant impervious lining completely surrounding the spring leaves, an outer metallic reinforcing casing closely embracing the lining, a grease gun coupling means attached to the device including a threaded flanged member disposed between the lining and the spring to which the grease gun coupling member is adapted to be attached.

9. In combination a laminated spring, a lubricant receiving casing comprising an inner flexible lubricant impervious lining, an outer metallic reinforcing casing embracing and reinforcing the lining and grease gun coupling means attached to the casing including an inner threaded thimble disposed between the lining and casing, an outer clamping washer disposed exteriorly of the casing and a threaded coupling member engaging the thimble to cause the thimble and washer to compress the lining against the casing.

In testimony whereof, I hereunto affix my signature.

LAWRENCE SKOK.